US006050356A

United States Patent [19]

Takeda et al.

[11] Patent Number: 6,050,356

[45] Date of Patent: Apr. 18, 2000

[54] ELECTRICALLY DRIVEN WHEELCHAIR

[75] Inventors: Toru Takeda; Kaoru Hatanaka, both of Saitama, Japan

[73] Assignee: Honda Giken Kogyo Kabushiki Kaisha, Tokyo, Japan

[21] Appl. No.: 08/928,489

[22] Filed: Sep. 12, 1997

[30] Foreign Application Priority Data

Sep. 12, 1996 [JP] Japan .................................... 8-241781
Sep. 12, 1996 [JP] Japan .................................... 8-241782

[51] Int. Cl.$^{7}$ ........................................................ B60K 1/00

[52] U.S. Cl. ..................... 180/65.1; 180/907; 280/250.1; 280/304.1; 297/DIG. 4

[58] Field of Search .................................... 180/907, 65.1, 180/65.2, 11, 294, 295, 298; 280/250.1, 304.1; 297/188.13, 188.08, 217.3, DIG. 4

[56] References Cited

U.S. PATENT DOCUMENTS 3,613,813 10/1971 Biddle ..................................... 180/907
3,749,192 7/1973 Karchak et al. ................... 297/DIG. 4
3,945,449 3/1976 Ostrow .................................. 180/65.5
4,209,073 6/1980 Enix ....................................... 180/65.1
5,111,899 5/1992 Reimann ................................ 180/65.1
5,234,066 8/1993 Ahsing et al. .......................... 180/907
5,253,724 10/1993 Prior ....................................... 180/65.8
5,291,959 3/1994 Malblanc ................................ 180/907

FOREIGN PATENT DOCUMENTS 51-100556 9/1976 Japan .
7-313555 12/1995 Japan .
8-117291 5/1996 Japan .

*Primary Examiner*—Lanna Mai
*Assistant Examiner*—Lynda Jasmin
*Attorney, Agent, or Firm*—Birch, Stewart, Kolasch & Birch, LLP

[57] ABSTRACT

A wheelchair includes an upper structure A and lower structure B which can be freely assembled and separated. Upper structure A includes a seat, back rest, seat rail, cross member, cross member and a subframe. Electrical equipment including a control unit and battery, etc., is housed inside a housing mounted on the bottom part of seat. A motor is supported under the cross member. The lower structure includes the left and right pair portions of a main frame, front wheels, drive wheels and hand rims. Upper structure A can be separated and removed from lower structure B by folding down the back rest and removing the upper structure A. The output axis is removed from the axle stay by moving the motor towards the center of the wheelchair body. A housing cover is fitted to the rear face of a base plate provided on a seat of the wheelchair. A freely opened and closed lid is provided for the opening provided on the front portion. A guide plate is provided on the front of the housing formed by the base plate and the housing cover. A control unit is fitted to the rear. When the lid is opened and battery is inserted from the front into housing cover and guided and supported by the guide plate, the battery simultaneously connects with the discharge connector at the side of control unit.

10 Claims, 13 Drawing Sheets

ELECTRICALLY DRIVEN WHEELCHAIR

BACKGROUND OF THE INVENTION

1. Field of the Invention

The present invention relates to an electrically driven wheelchair.

2. Description of Background Art

Electrically driven wheelchairs with manually rotated drive wheels with an assisted drive are well known. For example, electrically driven wheelchairs are disclosed in Japanese Laid Open Patent Application No. Sho-51-100556, and Japanese Laid Open Patent Application No. Hei-8-117291. These wheelchairs can be folded in two along their width for transportation and storage. Also, wheelchairs are known wherein the motor is housed within the hub of the drive wheel and when folding, the left and right wheels are separated from the motor and frame.

However, the above-mentioned models, wherein the drive wheels are separated, are divided into three construction parts. Of these parts, the wheelchair body frame contains electrical equipment including the battery which is both bulky and heavy. This separation when compared to the weight of the drive wheels is unbalanced due to the large difference in the weight distribution. Therefore, it is difficult for a user to load the heavy separated parts into a transportation vehicle, etc. Also, when assembling the wheelchair, as the drive wheel is first attached to the one side of the frame, after which, The remaining wheel is then attached to the other side, the wheelchair frame tends to become unbalanced, again making it difficult for a user to assemble the wheelchair.

In addition, a fold-up type wheelchair with an electrical driving apparatus attached thereto is provided with a saccate box containing a battery mounted to the back side of a cloth seat as disclosed in Japanese Laid Open Patent Application No. Hei-7-313555.

However, in the Japanese Laid Open Patent Application No. Hei-7-313555, the operation of removing the battery for changing, etc., is difficult since each time the saccate box must be detached from the seat. In addition, it is inconvenient as the saccate box can not be detached while remaining seated on the seat, making it impossible for this operation to be performed by the wheelchair user.

Furthermore, it is desirable to make it possible to use the wheelchair outdoors to support an active life-style. However, in general, wheelchairs with an electrical driving apparatus attached, including the wheelchairs disclosed in the related art are, on the whole, intended for indoor use. Therefore, it is necessary to give consideration to the protection of the electrical equipment from dirt and debris such as mud, flying stones and water, etc., when used out doors.

SUMMARY AND OBJECTS OF THE INVENTION

The present invention is directed to an electrically driven wheelchair, with drive wheels driven by a battery powered motor, equipped with a wheelchair body frame and a seat. The drive wheels are supported by the wheelchair body frame and a housing is provided to house electrical equipment including the battery and control unit mounted to the seat base plate. The seat with an integrated housing part is freely detachable from the wheelchair frame.

The seat, drive wheel and drive force transmission device are supported by the wheelchair frame with a motor attached to the seat. The seat is freely detachable from the wheelchair frame. When detaching the seat, the motor can be freely connected or disconnected from the driving force transmission device.

As a housing part has been provided on the under side of the seat for the battery, in which heavy electrical equipment including the battery and the control device are housed, it is possible to make the weight of the seat part approximately equivalent to a conventional manually operated type wheelchair. Therefore, when separating the seat from the wheelchair frame each of the separate parts have approximately the same weight as those of a conventional manually operated type wheelchair. This enables an unaided user to store, etc., each of the separate parts as the user would do for a conventional wheelchair. Also, when assembling the wheelchair, due to the operation of attaching the seat to the wheelchair body frame, the left and right sides of the wheelchair body do not become unbalanced during the assembly process, enabling an unaided user to assemble the wheelchair.

The motor is mounted to the seat. Further, the drive force transmission device is mounted to the wheelchair body frame so that when removing or replacing the seat, as the motor freely connects or disconnects from the drive force transmission device, the weight distribution of the seat and the wheelchair body frame is more balanced.

The housing for a battery and a control unit, etc. provided on the under surface of a seat, includes an opening portion for inserting and removing the battery which is located on the front part of the housing.

The opening portion is fitted with an opening and closing lid.

The battery is detachable freely in a forward direction in parallel with the base plate of the seat.

The discharge terminal of the battery and the discharge connector of the motor connects or disconnects together with the detachment operation of the battery.

Since the opening portion is provided on the front side, the removal operation of the battery does not interfere with members of the body, thereby enabling the housing to be located in a high position as close as possible to the seat. As a result, the internal electrical equipment is securely protected from splashed mud, flying stones and the impact of projections on the road during use of the wheelchair outdoors. Furthermore, the outward appearance of the wheelchair resembles that of a common, light, manually operated wheelchair rather than an electrically operated type.

Due to the provision of a lid, the opening part can be closed with the lid after installing the battery, making it possible to prevent rain water from entering the internal part of the housing through the opening part, thereby increasing the water resistance capability of the internal part housing the battery, control unit and other electrical equipment and in particular the area around the discharge connector. Consequently, increasing the protection of the battery and the control unit from dirt and projections and increasing the water resistance capability of the discharge connector, etc., has made the wheelchair suitable for use both indoors and outdoors.

As the battery removal operation is performed in a forward direction parallel to the base plate of the seat, the detachment operation when replacing the battery, etc., is carried out in a location which can be reached by the user, allowing an unaided user to carry out the operation while seated, simplifying the removal and replacement process.

As the discharge terminal of the battery and the discharge connector of the motor connects or disconnects together with the battery detachment operation, it is unnecessary to performs the operation while looking inside the housing, simplifying and speeding up the connecting and disconnecting of the terminal in the detachment operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figures 1A, 1B:
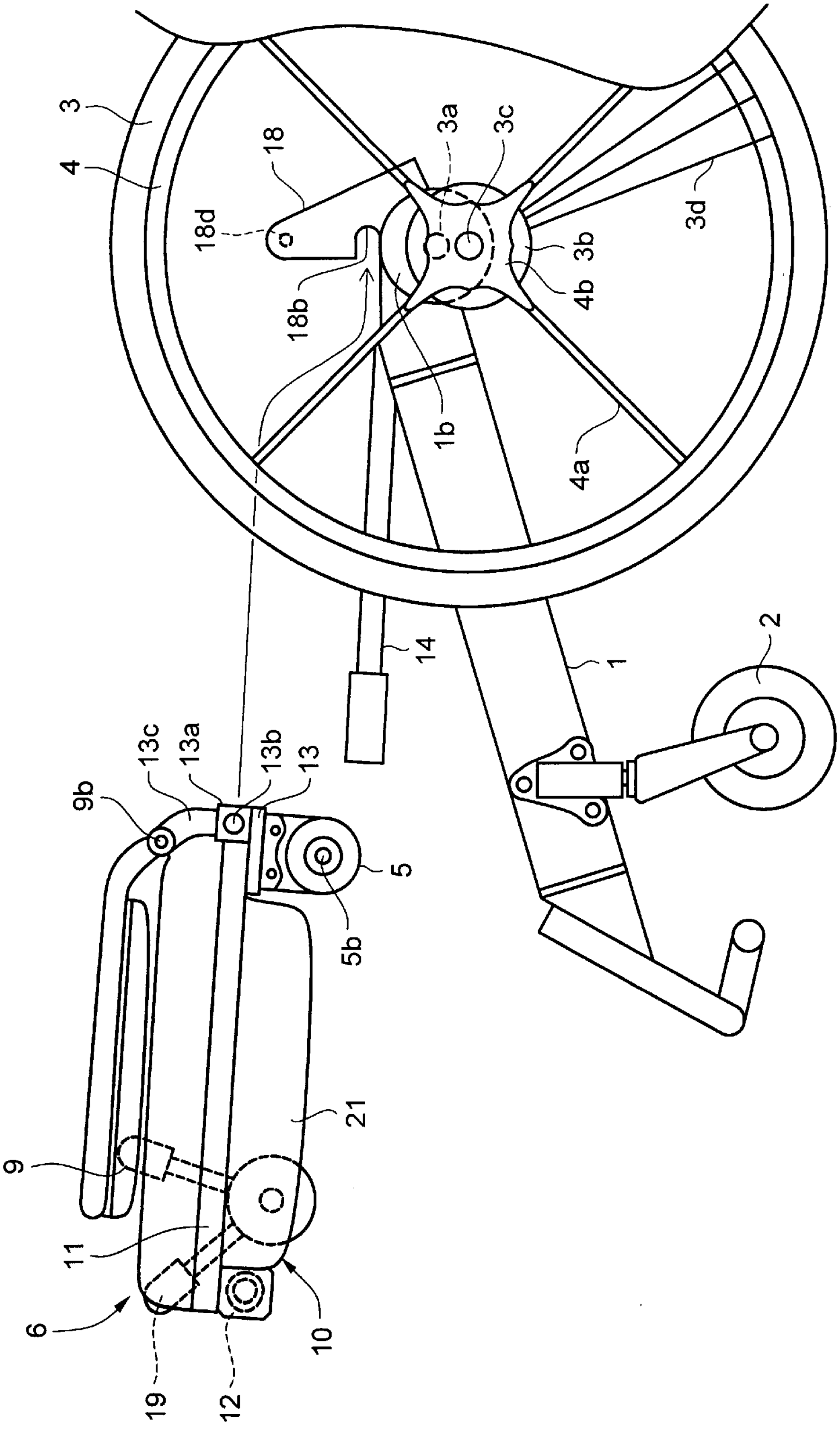
FIG. 1 is a simplified side view of a portion of a wheelchair according to the present invention.
Figure 2:
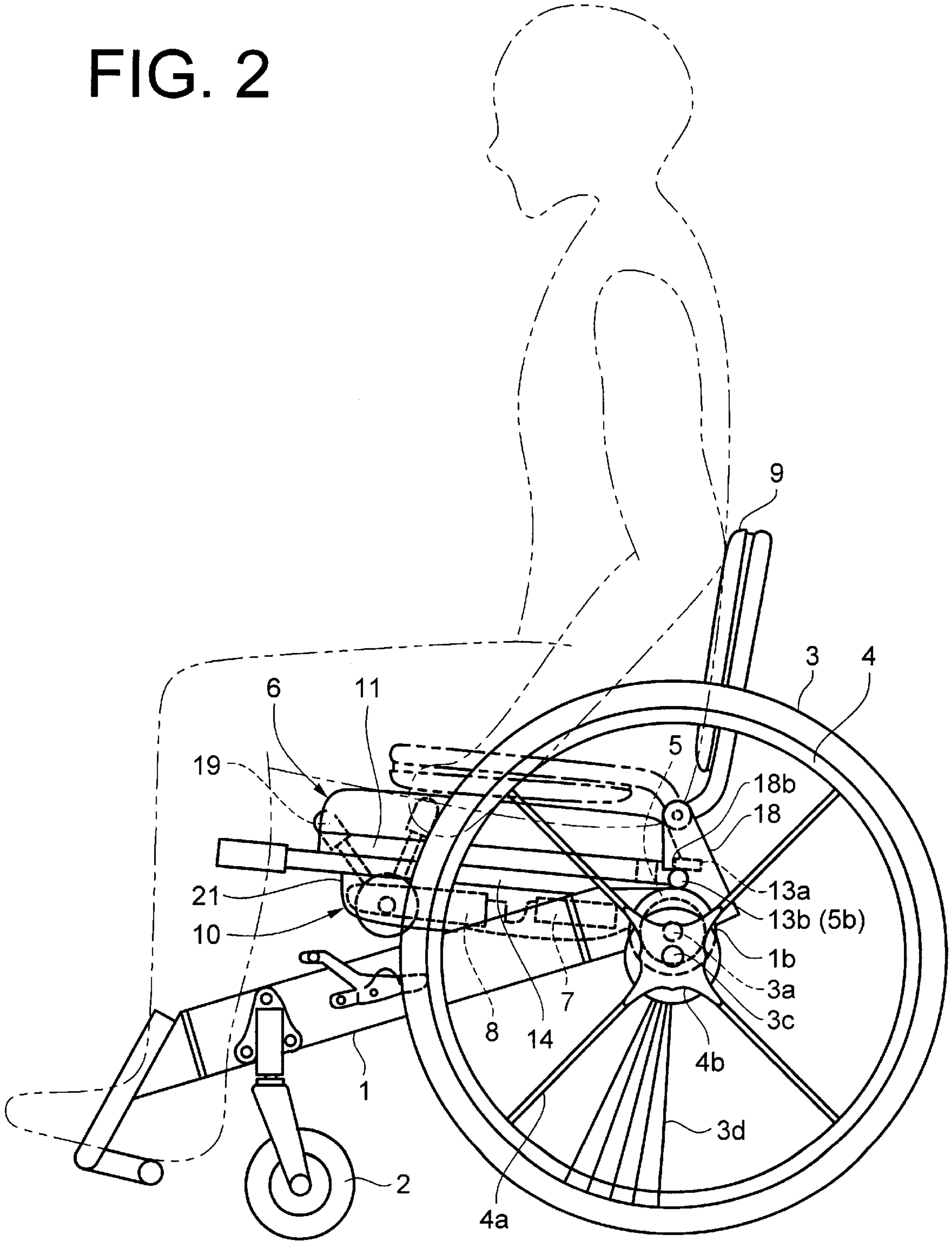
FIG. 2 is a side view of the wheelchair.

Below is a description of a first embodiment as illustrated in FIG. 1 to FIG. 6.

As clearly shown in FIGS. 1–6, the wheelchair with an electrical driving apparatus attached consists of a main frame 1 having a pair of left and right members extending obliquely to the rear, with caster wheels 2 fitted to each of the front end portions, and drive wheels 3 fitted to the rear portions. A hand rim 4 of a slightly smaller diameter and with the same center of rotation is attached to the outside of drive wheel 3. The hand rim 4 is constructed so as to be capable of being rotated manually or assist driven by the motor. A hub 3*b* of the drive wheel 3 is provided with spokes 3*d*. Spokes 4*a* of the hand rim 4 are mounted on a hub 4*b* of the hand rim.

The assist quantity is determined by control unit 7 provided under a seat 6. The assist is based on the torque differential between the drive wheel 3 and the hand rim 4 which is detected by the torque sensor contained in hub 3*b*, which is omitted from the drawing. The assist is provided by a motor 5 powered by a battery 8. A housing 10 which houses the electrical equipment 7, 8 is formed on the bottom of seat 6. The housing 10 is housed within the rectangular space S surrounded by a seat rail 11 and on the front and back by cross members 12, 13. A freely folding back rest 9 folds down onto the seat 6.

Figure 4:
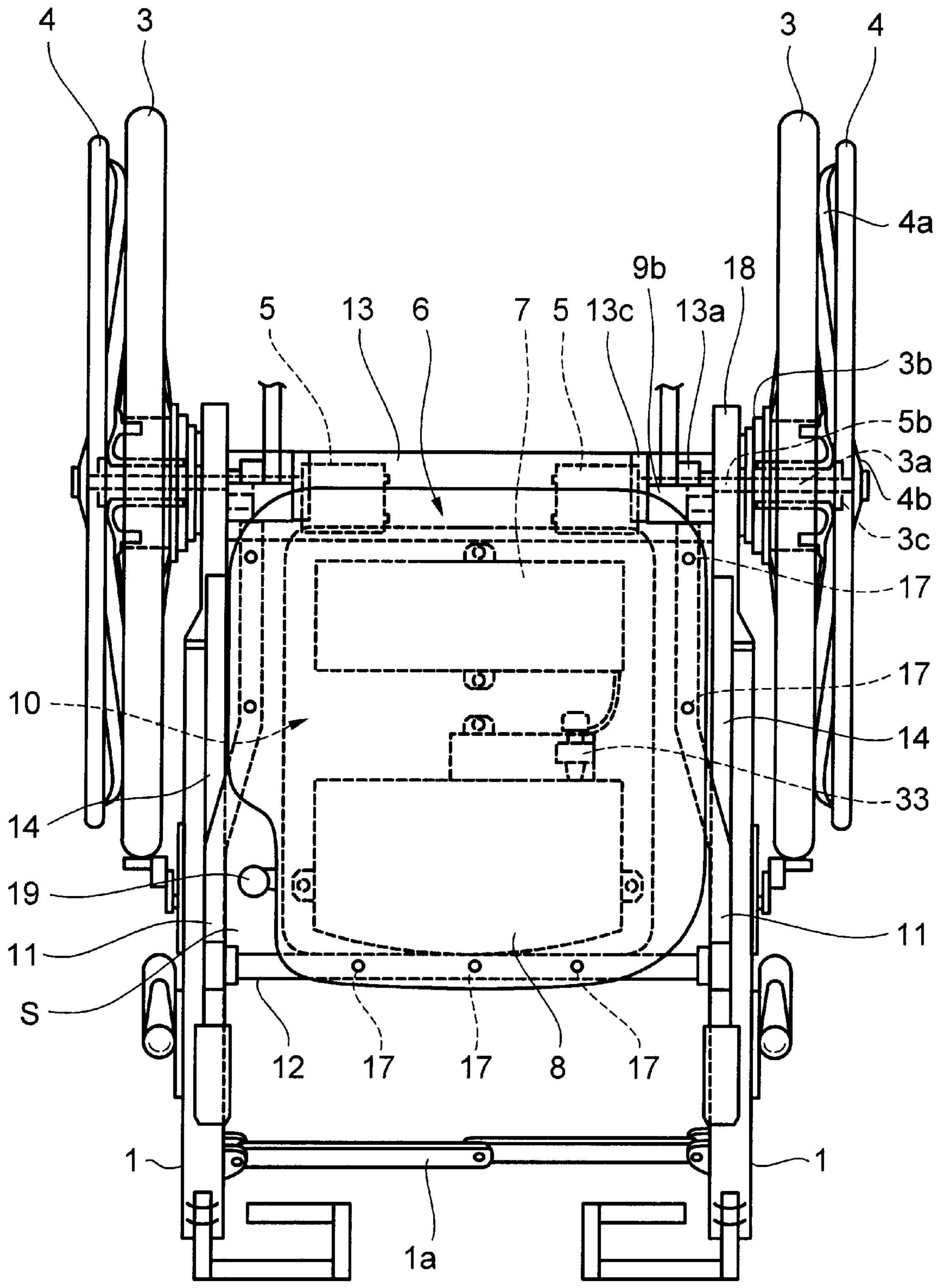
FIG. 4 is a plan view of the wheelchair.

Seat rails 11 include a pair of left and right members extending almost parallel from front to back and are supported on the left and right side of a subframe 14 mounted sloping slightly upwardly towards the front so as to be almost overlapping with the upper parts of the left end right parts of mainframe when viewed from above. A cross member 13 extends across each of the end parts of the left and right seat rails 11. A rim part of the base plate 15 of seat 6 rests on frame members 11, 12, 13, by engaging pre-fitted engagement lugs made of rubber, etc., which are omitted from the drawings and mate with corresponding engagement holes 17, as illustrated in FIG. 4, formed on the upper surface of the aforementioned frame members. Thus the seat 6 can be both supported and freely detachable from the frame.

As clearly shown in FIG. 1, it is possible to separate the wheelchair into an upper part structure A and lower part structure B. Upper part structure A includes the seat 6, back rest 9, seat rail 11, cross member 12, cross member 13, subframe 14, in addition to the motor 5, control unit 7 and battery 8, etc., and other electronic equipment housed in the housing 10.

Figure 3B:
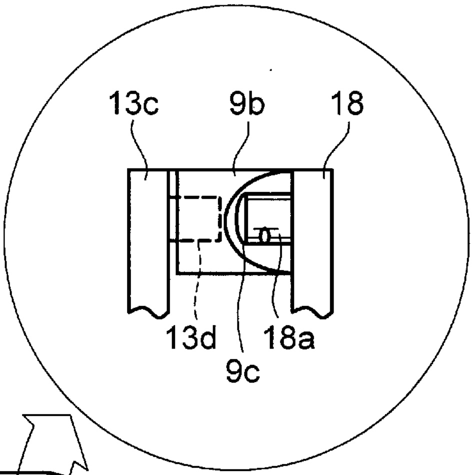
FIG. 3 is a rear view of the wheelchair.
Figure 3A:
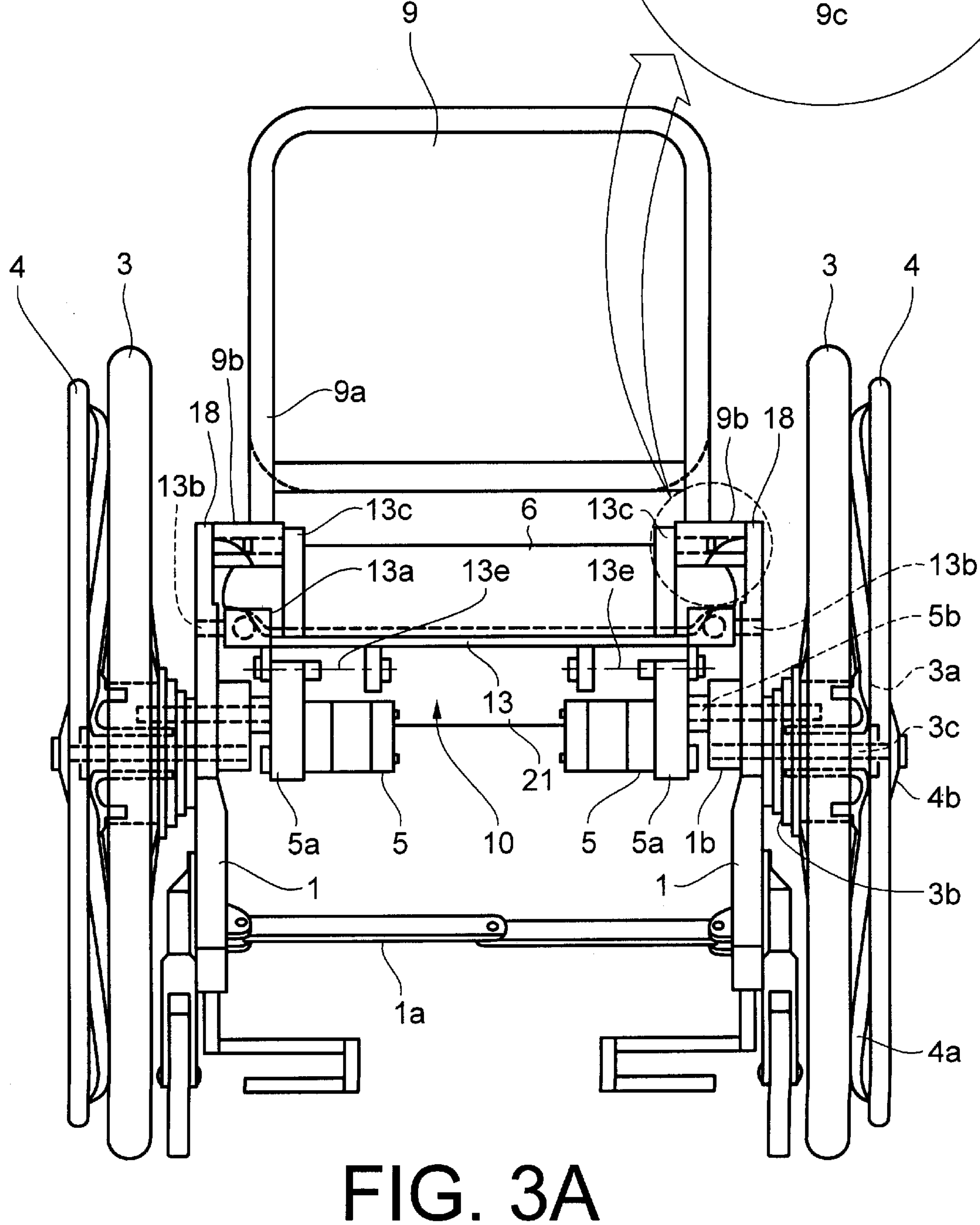

Lower part structure B includes the left and right portions of mainframe 1, front wheels 2, drive wheels 3, hand rims 4 and subrims 14, etc. Furthermore, the left and right portions of mainframe 1 can be freely folded together and connected as an integrated unit by link member la as illustrated in FIG. 3 and FIG. 4.

The connection between upper structure A and lower structure B occurs in a total of 3 locations; hinge part boss 9*b* of the back rest 9, the joint provided on the back end portion of the seat rail 11, and the motor 5.

The hinge part boss 9*b* is provided with a cut off portion 9*c*. The upper end portion of stay support shaft 18*a* which protrudes inwardly towards the wheelchair body fits into the upper end portion of stay 18 which protrudes upwards from the back end of main frame 1. Further, support shaft 13*d* protrudes outwardly from the upper end of stay 13*c* which protrudes upwardly almost parallel with stay 18 and fits into both left and right end portions of the cross member 13. Cut off part 9*c*, when engaged with the support shaft 18*a*, prevents the seat 6 from being removed in a forward direction while the back rest 9 is in an upright position. However, as shown in the enlargement, when the back rest 9 is in a folded down position, due to the approximately 90° rotation of the hinge part boss 9*b*, support shaft 18*a* does not engage with the hinge boss 9*b*, enabling the seat 6 to be removed.

Joint 13*a* is attached to both the left and right ends of cross member 13. The rear end portion of the seat rail 11 is connected to the front surface of the seat. Engaging pin 13*b* protrudes outwardly and is provided on the outside surface of the cross member 13. Engaging pin 13*b*, by moving seat rail 11 of seat 6 resting on subframe 14 in a backwards and forwards direction, can be disengaged in a forward direction towards stay 18. The engaging pin 13*b* is freely detached along engaging grove 18*b*.

Figure 5:
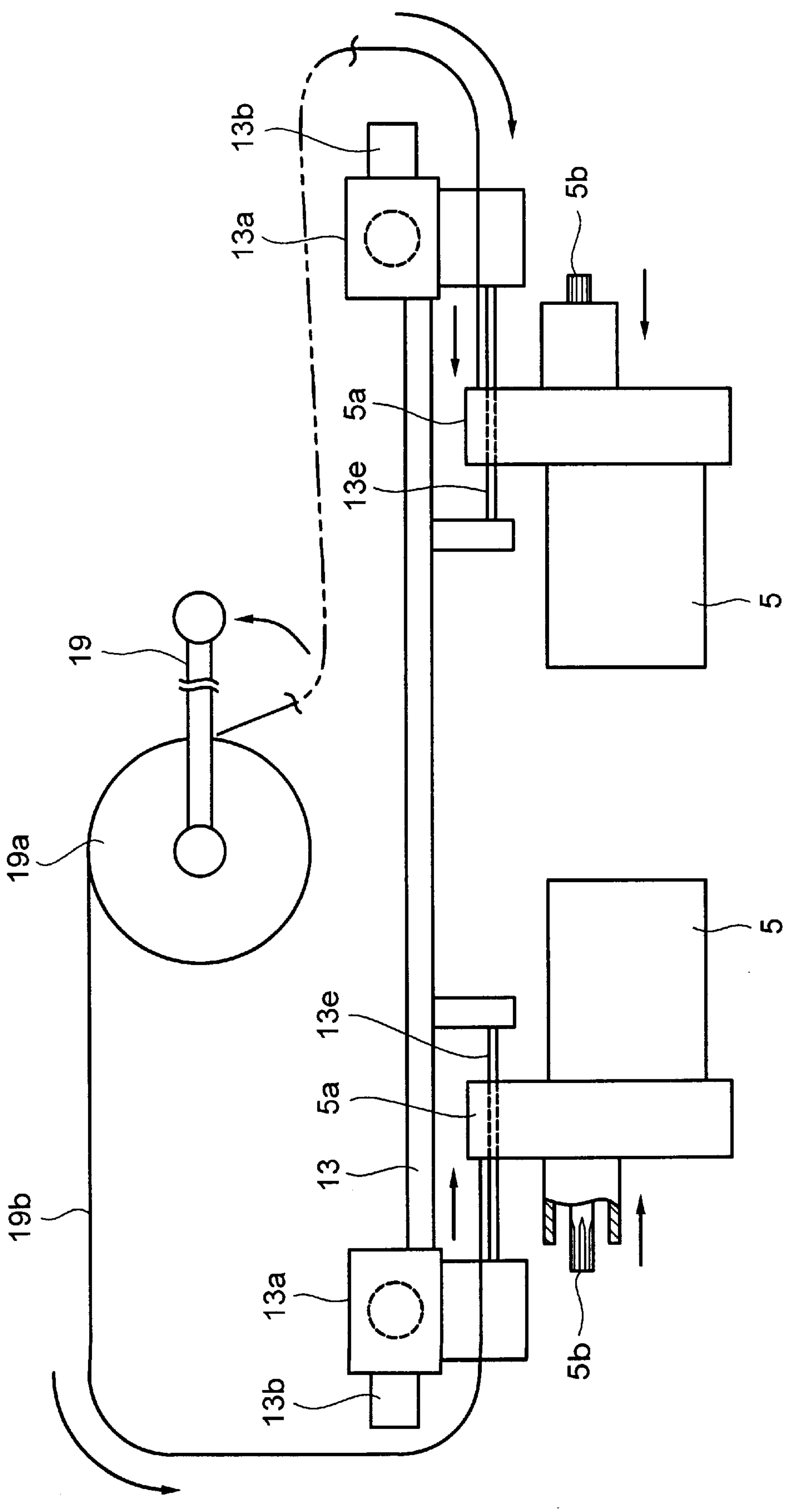
FIG. 5 is a schematic view describing the removal and replacement of the motor.
Figure 6:
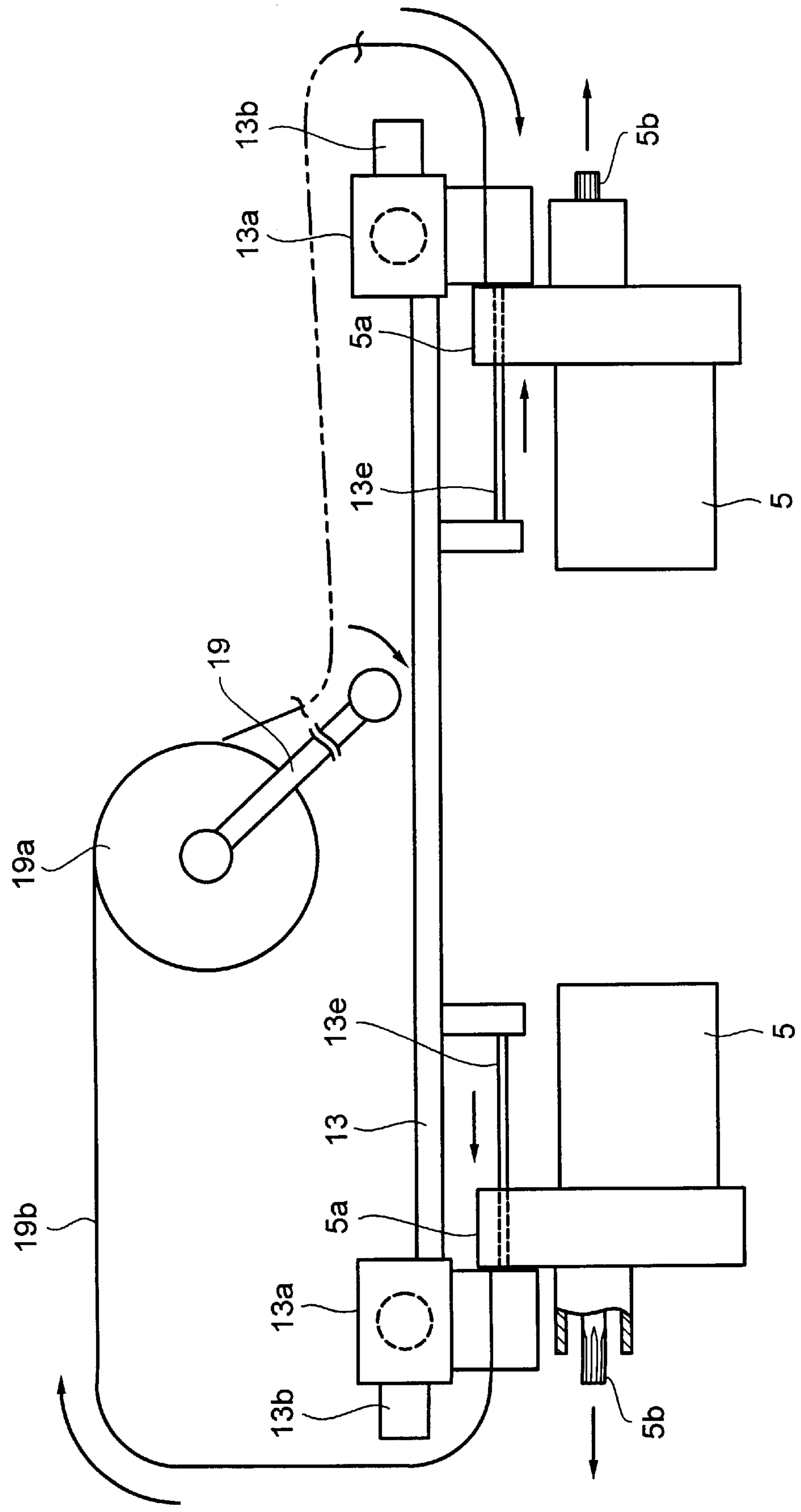
FIG. 6 is a schematic view describing the removal and replacement of the motor.

Motor guide 13*e*, to which motor 5 is suspended and supported through slider 5*a*, is provided on the rear surface of both the left and right ends of cross member 13. The motor 5, as shown in FIGS. 5 and 6, moves freely along the width of the wheelchair body through slider 5*a* mounted on motor guide 13*e*. Output axis 5*b* is able to change to a disconnection location, a shown in FIG. 5, and to a connection location, as shown in FIG. 6. The movement of the motor 5 is operated by actuating lever 19, wire 19*b* connected to a revolving drum 19*a* operated by actuating lever 19 which is attached to the slicer 5*a*.

At the connection location of the output axis 5*b*, as shown in FIGS. 3 and 4, it is possible of drive gear shaft 3*a* to become attached to the axle stay 1*b* provided on the rear end part of main frame 1 so that the drive gear 3*a* and axle stay 1 rotate as a single body. Inside hub 3*b* of the drive wheel, the other end of drive gear shaft 3*a* is connected to a drive gear omitted from the drawings. Drive rotating hub 3*b* rotates drive wheel 3 around axle 3*c* using this drive gear. One end of axle 3*c* is supported by the center of drive wheel 3, the other end is supported by axle stay 1*b*.

In dismantling the wheelchair, as shown in FIG. 1, backrest 9 is folded down onto seat 6, and, by operating the actuating lever 19, motor 5 is moved inwardly towards the body of the wheelchair, as shown in FIG. 5. In this way, hinge part boss 9*b* can be separated from stay 13*c*, and output axis 5*b* of motor 5 can be separated from axle stay 1*b*. By pulling seat 6 forwards, engaging pin 13*b* can then be removed from the engaging groove 18*b*, separating the whole upper structure A from the lower section B. Also, by performing the operation in the opposite order, the upper structure A can be simply attached to the lower structure B.

Figures 7A, 7B:
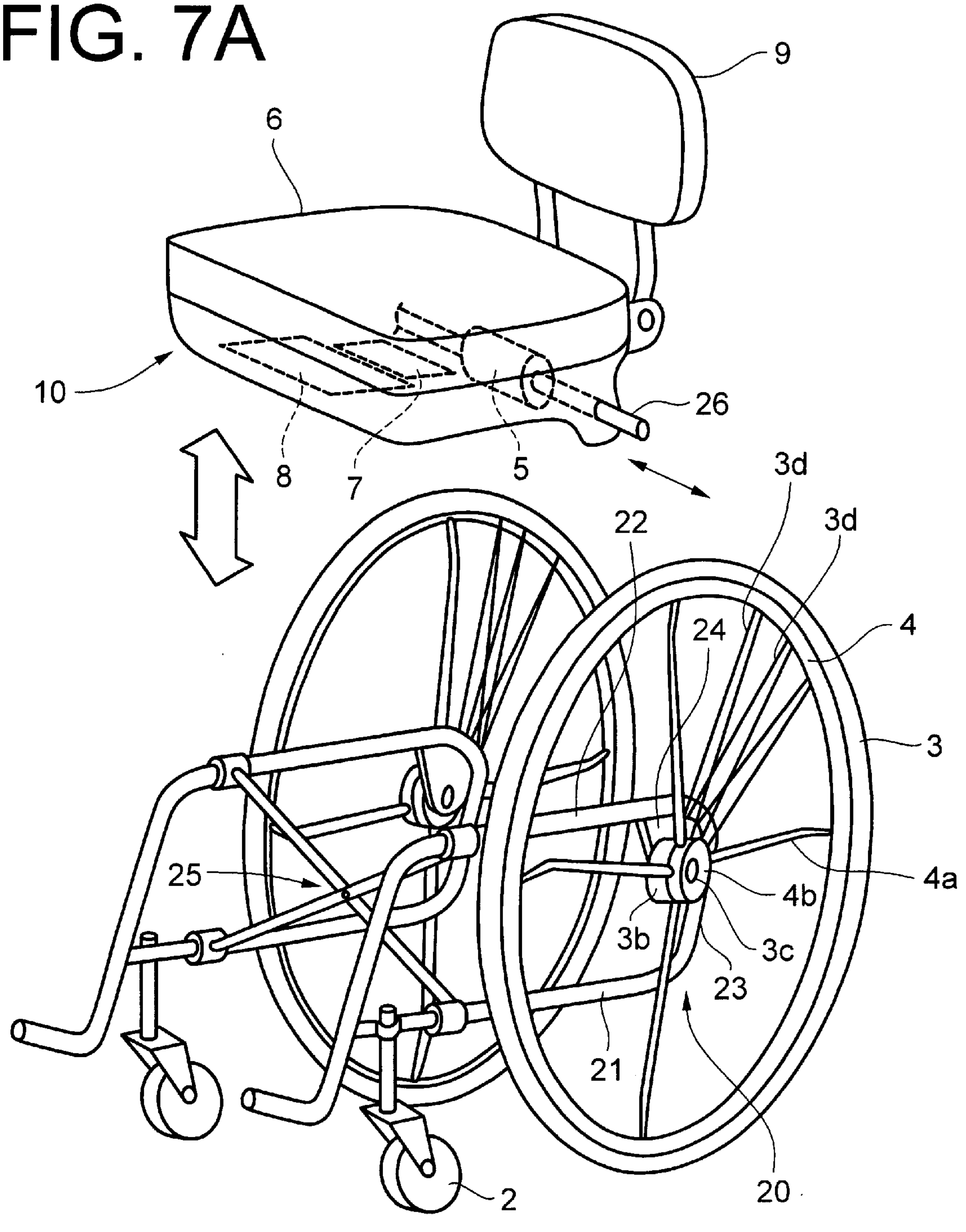
FIG. 7 is a perspective view of the separation of a second embodiment of the present invention.

FIG. 7 shows a second embodiment wherein a mainframe 20 is formed in a loop shape for supporting a lower part 21 with front wheels 2 attached to front portions thereof and an upper part 22 provides a support part for the seat 6. An axle support stay 24 is provided on the corner parts of upper portion 22 and upper and lower portions 23, with an axle 3*c* supporting a hub 3*b* of a drive wheel 3. A torque sensor determines the torque differential manually applied to the hand rim. The torque sensor is contained inside the hub 3*b*. The left and right portions of main frame 20 can be freely folded up and joined together by an X-shaped link member 25.

In the upper structure A the housing 10 is formed in the bottom of the seat 6, in which the motor 5, control unit 7, battery 8, and other electrical equipment is housed. Transmission axle 26, attached to the rear end part of the left and right surface of the housing 10, moves backward and forward freely along the width of the wheelchair body and is operated by an operation member not shown in the drawings.

The transmission axle 26 is formed either in combination or independently of the output axis of the motor 5 and is connected to enable combined rotation. Seat 6 rests on the left and right portions of the upper part 22 of main frame 20. When the transmission axle 26 is moved to protrude outwardly, and is connected to hub 3 through axle support stay 24, upper structure A and lower structure B are connected as one. The transmission axle 26, in the configuration of the previous embodiment, does not connect directly with the axle 3c. Namely, the transmission axle 26 does not use axle 3*c* as a drive shaft. The transmission axle 26 enables the drive rotation of hub 3*b* around the periphery of axle 3*c*.

When constructed in the configuration of the present embodiments, upper structure A and lower structure B have approximately the same weight distribution, enabling them to be separated both simply and speedily. Furthermore, common notation has been used for members common to the configuration of the previous embodiment.

The following is a description of the third embodiment with reference to FIGS. 8–13 of the drawings.

As shown in FIGS. 8–13, the wheelchair includes an electrical driving apparatus attached to a mainframe 101 with left end right pair portions sloping upwardly towards the rear. A caster 102 is mounted on each of the front end portions, and drive wheels 103 are mounted to the rear end portions. A hand rim 104 with a slightly smaller diameter and the same center of rotation is attached to the outside of each drive wheel. The drive wheels can either be rotated manually by the hand rim 104 or assisted to be driven by a motor.

The assist quantity is determined by a control unit 107 mounted on the under side of seat 106 based on the torque differential between the drive wheel 103 and the hand rim 104 detected by the torque sensor, omitted from the drawings. Motor 105 then assists using electric power provided by a battery 108.

A housing 110 is formed on the bottom part of seat 106 to house electrical equipment 107, 108. The housing 110 is contained within the rectangular space S surrounded by a seat rail 111 and cross members 112, 113 at the front and back. A free folding back rest 109 is mounted on the seat 106.

Seat rails 111 include a pair of left and right members extending almost parallel from front to back which are supported on the left and right of a subframe 114 mounted sloping slightly upwardly towards the front so as to be almost overlapping with the upper parts of the left and right portions of the mainframe when viewed from above. A cross member 113 extends across each of the end parts of the left and right seat rails 111.

Figure 13:
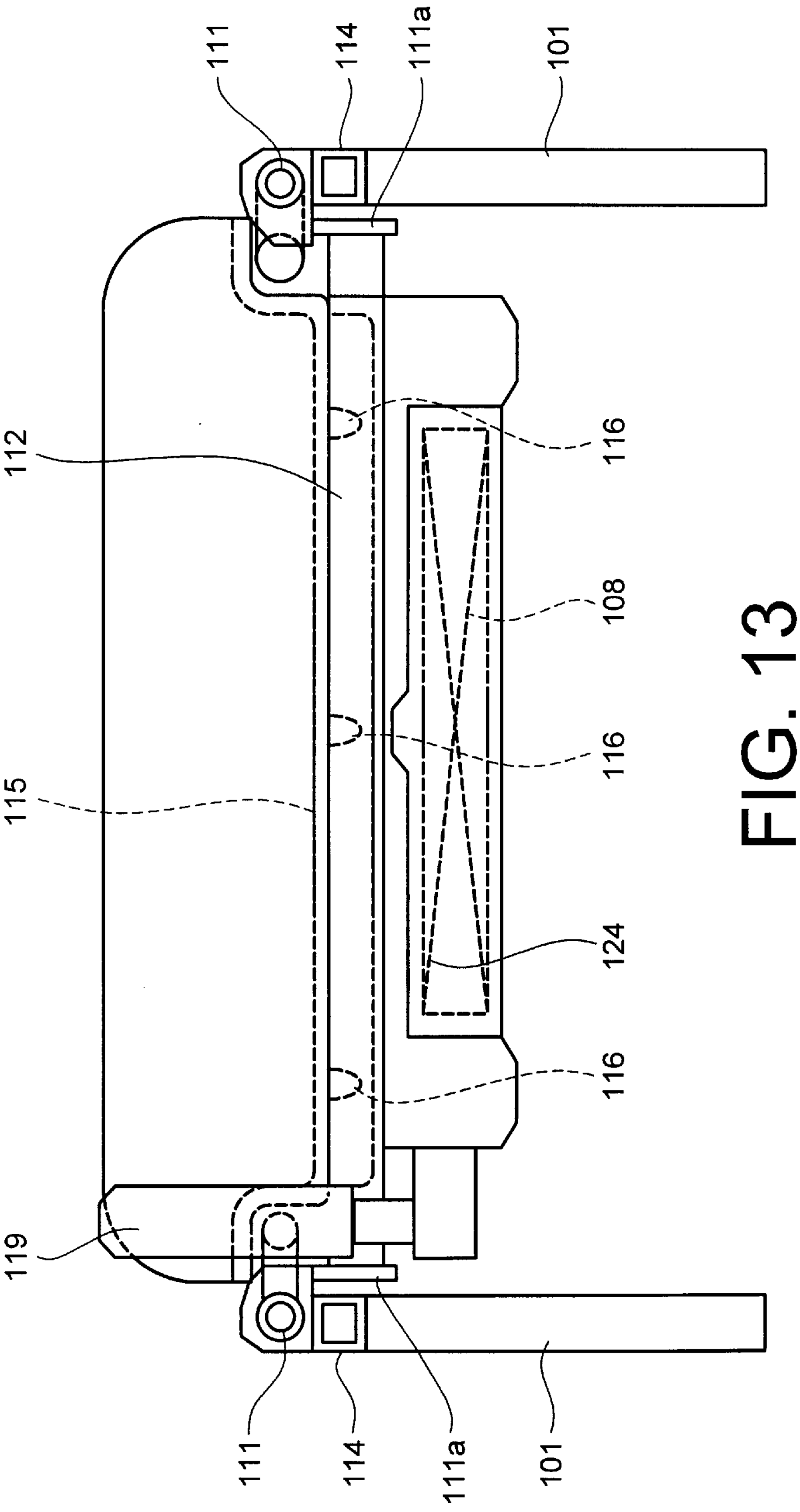
FIG. 13 is a view showing the seat part from the front side.

As clearly shown in FIG. 13, bracket 111*a*, which hangs downwardly and is bent inwardly towards the wheelchair body, is mounted on the front ends of the left and right seat rails 111 and a cross member 112 extends across the lower end parts of the left and right brackets 111*a*.

Figure 9:
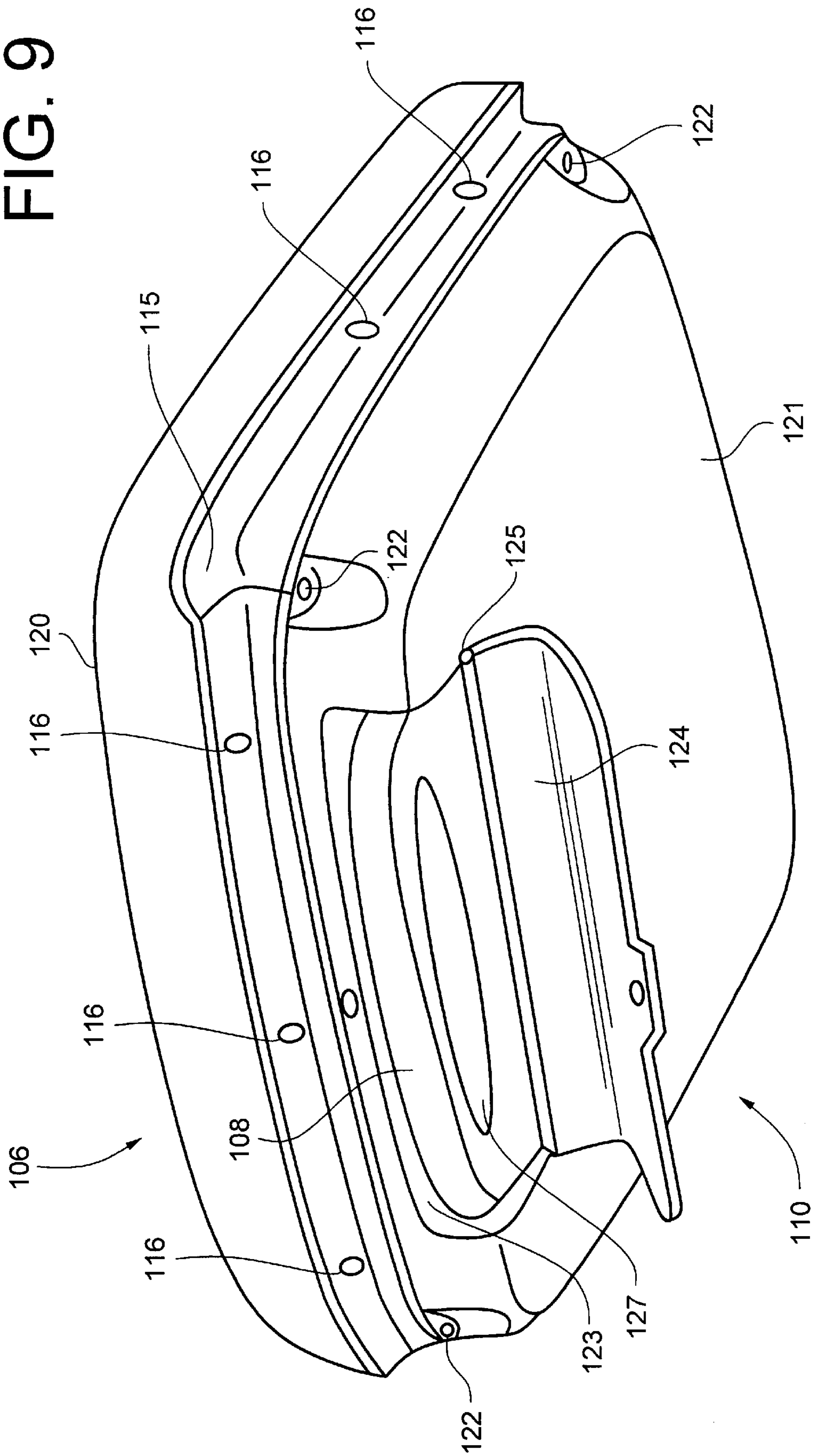
FIG. 9 is a perspective view from the bottom portion of the seat.
Figure 10:
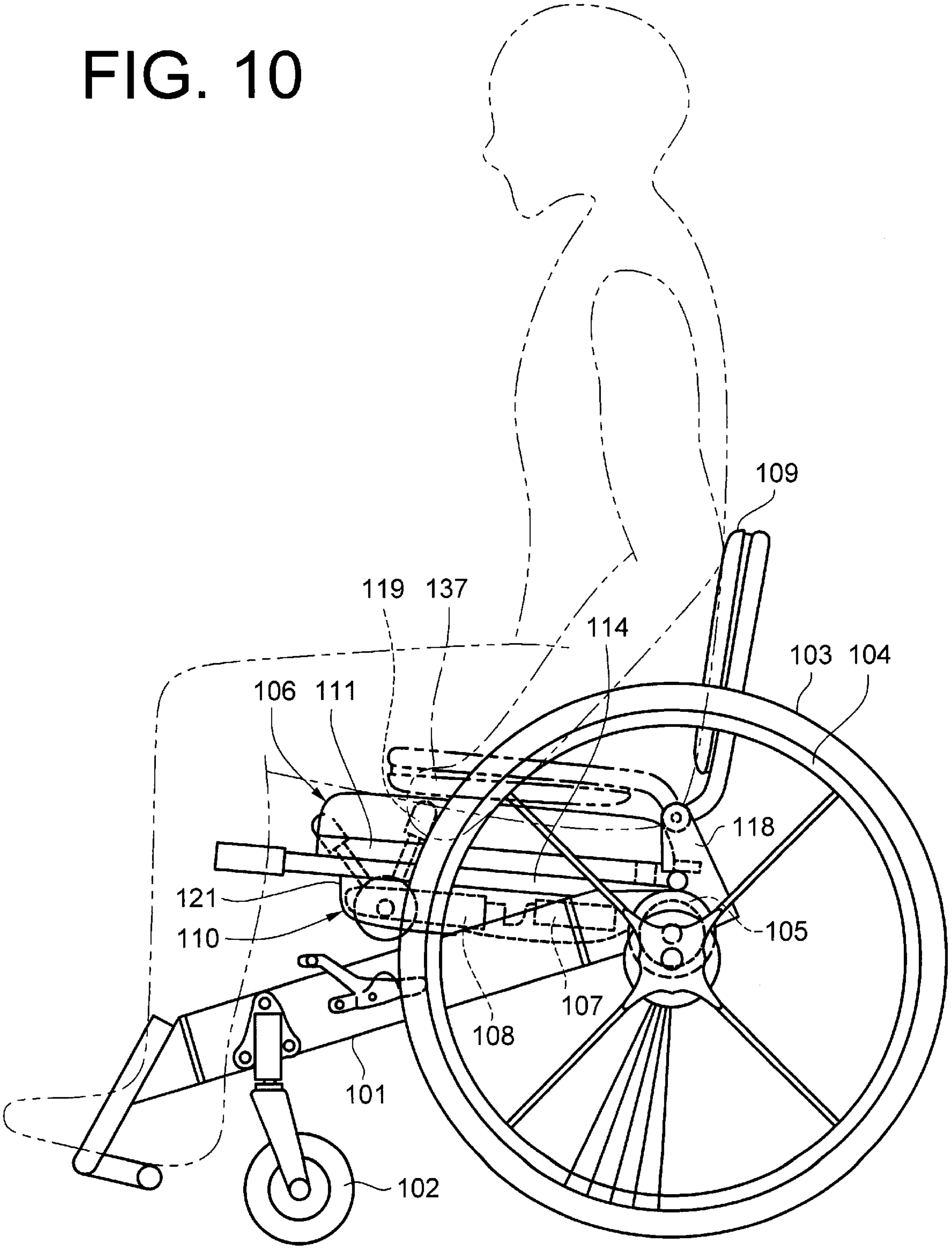
FIG. 10 is a left side view of the wheelchair according to the third embodiment of the present invention.
Figure 11:
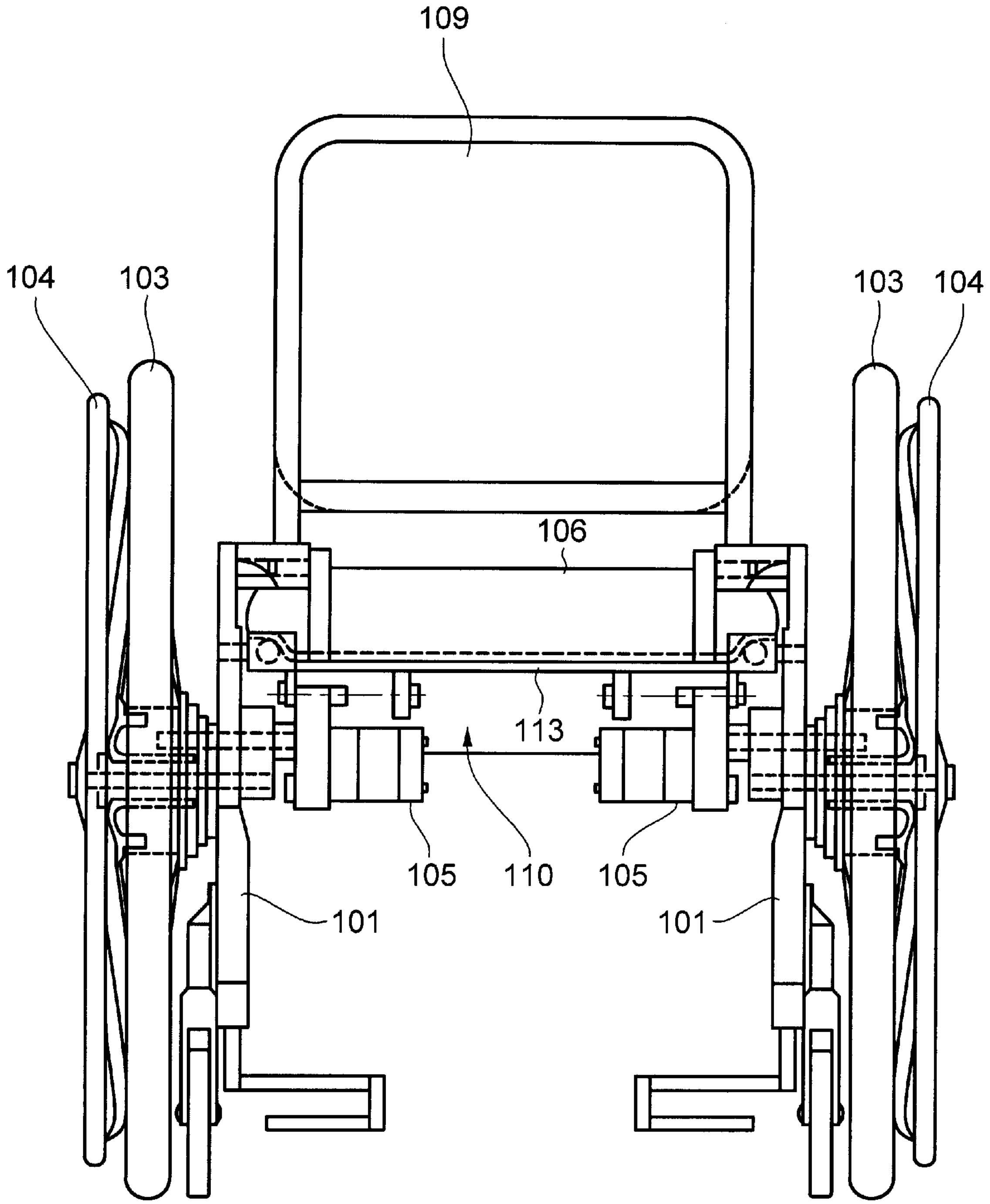
FIG. 11 is a rear view of the wheelchair according to the third embodiment of the present invention.
Figure 12:
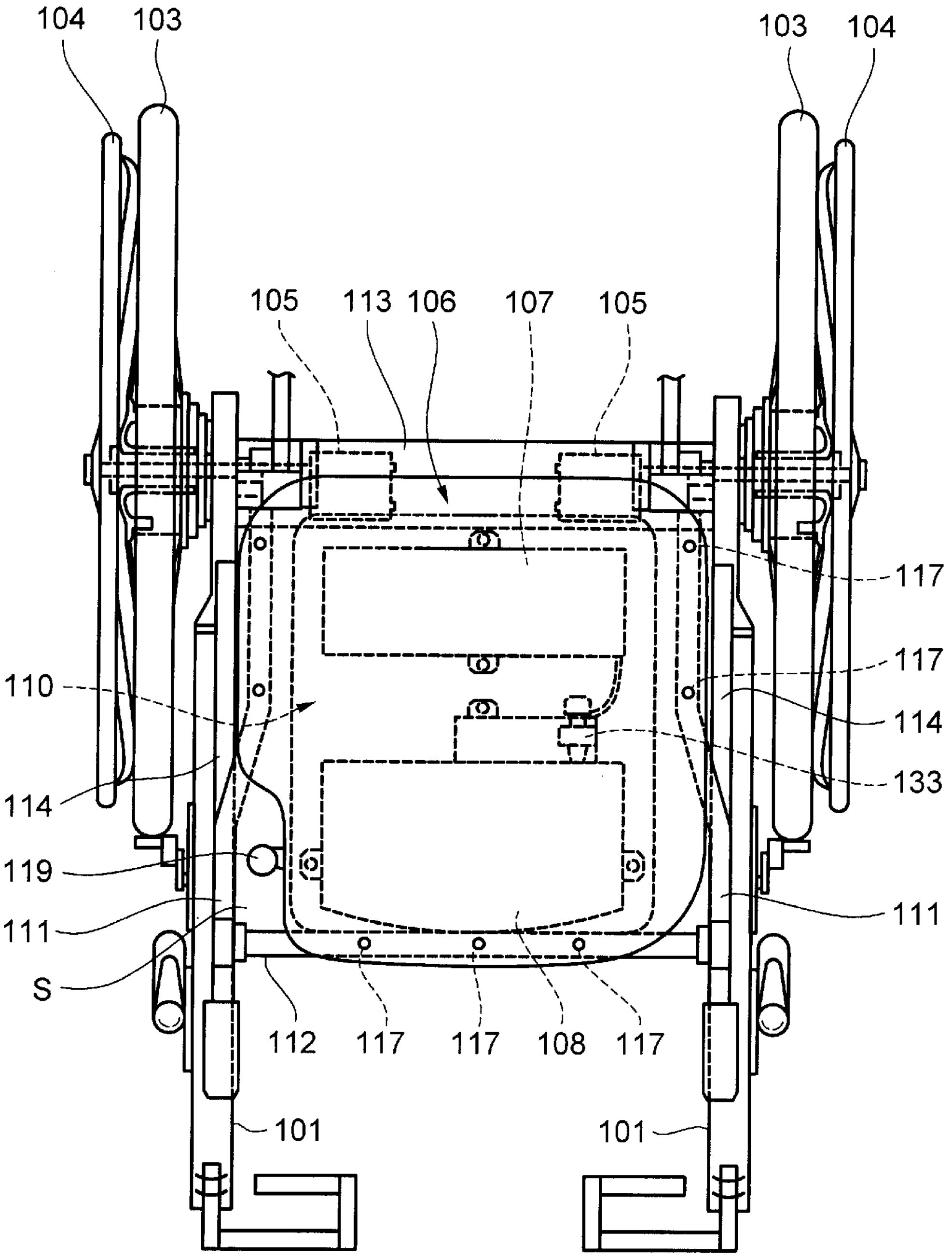
FIG. 12 is a plan view of the wheelchair according to the third embodiment of the present invention.

A rim part of a base plate 115 of seat 106 rests on frame members 111, 112, 113 by engaging pre-fitted engagement lugs 116 made of rubber, etc. as illustrated in FIG. 9, to correspond with engagement holes 117 as illustrated in FIG. 12 formed on the upper surface of the frame members. Thus, the seat 106 can be both supported and be freely detachable from the frame.

Figure 8:
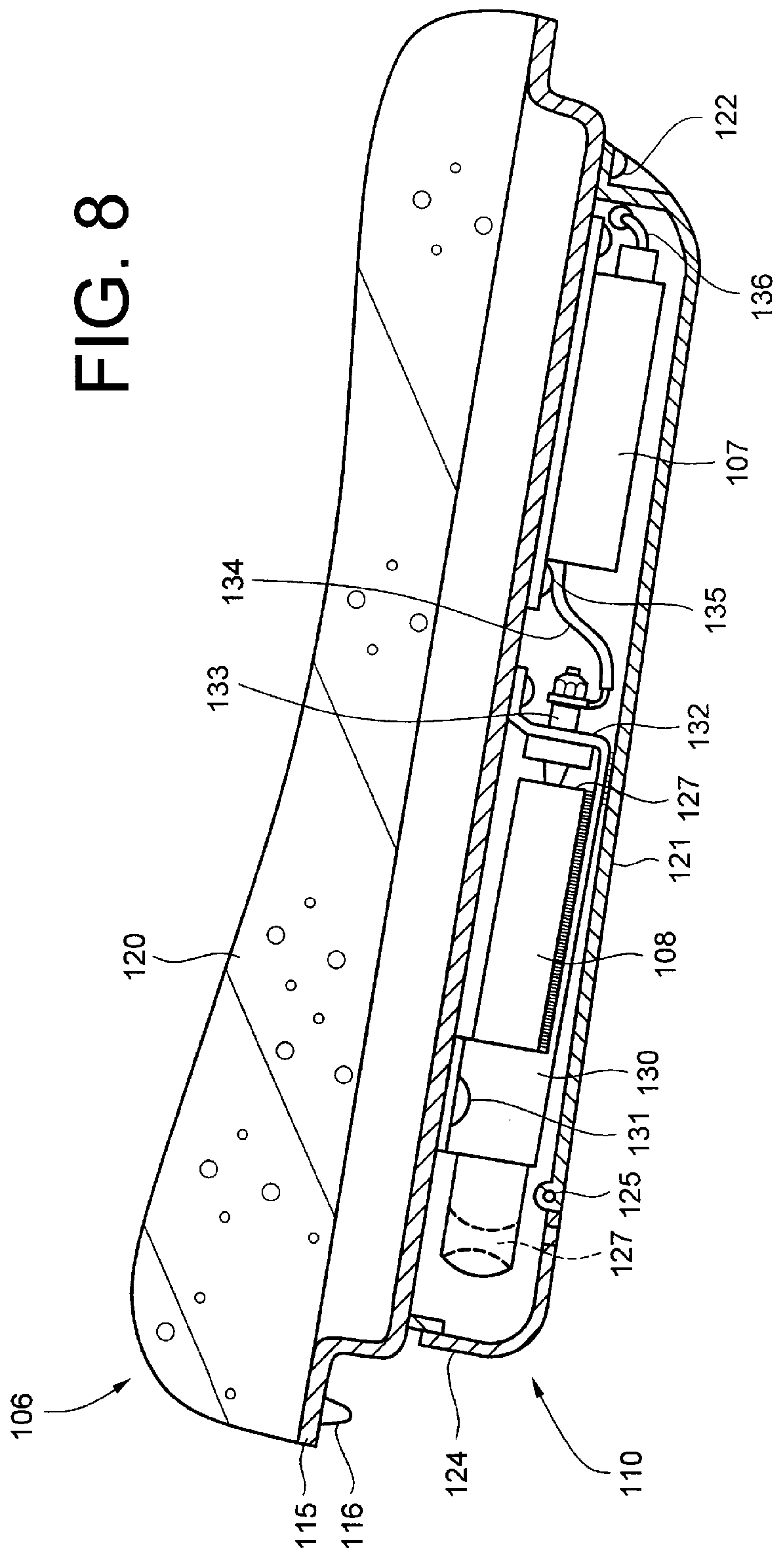
FIG. 8 is a cross-sectional view of the seat from front to back.

FIG. 8 is a side cross sectional view of seat 106. FIG. 9 is a perspective view showing seat 106 from the front on an angle from below. As shown in FIGS. 8 and 9, the seat 106 is provided with a seating cushion 120 and the housing 110 is mounted to the under surface of the base plate 115. Base plate 115 is constructed from synthetic resin, metal, wood material or other suitable material. On the under surface facing upwardly, an open container-shaped housing cover 121 is attached by screws 122 at four corners.

The housing cover 121 can be constructed from synthetic resin, metal, wood material or other suitable material but must be formed from a material of a sufficient relative hardness to withstand the impact of flying stones. The housing 110 is formed between the housing cover 121 and base plate 115. An open opening 123 is mounted to face forwardly to the front portion of the housing cover 121 and is provided with a freely opening and closing lid 124 fitted to the under side front part of the housing cover 121 by a hinge 125.

A handle is mounted on the front portion of the lid 124. The handle can be freely detached from the surrounding housing cover 121 using a suitable engagement member. The thin type battery 108 can be removed and replaced freely into the housing 110 through the opening 123. To facilitate the handling of the battery 108 during removal and replacement, an indent part 127, for use as a handle, is formed on the front part of the battery 108.

During insertion, the battery 108 is supported by a guide plate 130 fixed to base plate 115 by a screw 131. At this time, the female terminal, omitted from the drawings, which is formed on the back face of the back end part 128 of the battery 108 connects with the male discharge connector 133 supported by back end portion 132 of the same guide plate 130. However, these male and female parts may be reversed.

Discharge connector 133 is connected to the control unit 107 by a conductor 134. The battery 108 supplies electric power to control unit 107. Control unit 107 is attached to base plate 115 by screw 135. Control unit 107 is constructed from well known micro computers, etc. Based on the detected value of the aforementioned torque sensor, the control unit 107 provides assisted drive by utilizing the motor 105 according to a determined amount of required assisted drive. An output conductor 136 for this purpose extends to the motor 105.

In FIGS. 8 and 9, when removing the battery for replacing, etc., the lid 124 is opened, and the battery is inserted into the housing cover 121 from the front of the opening part 123 of the housing cover 121, or conversely, is extracted in a forward direction from the inside of the housing cover 21.

At this time, as the removal operation of the battery 108 is carried out in a forward direction parallel to base plate 115, it is possible to use the relatively hard and structurally sound base plate 115 as a guide member, making it unnecessary to look into the housing 110 while performing the operation. In addition, the provision of guide plate 130 ensures accurate guidance. Also, as the housing is in a position which can be reached by the wheelchair user, FIG. 10, the operation can be performed while seated, enabling the wheelchair user to perform the battery detachment operation him/herself with ease.

In addition, the battery detachment operation has been simplified and expedited as the discharge connector 133 is rigidly fixed to base plate 115, and the discharge terminal of the battery 108 and the discharge connector 133 of the control unit 107 connects and disconnects together with the detachment operation of the battery 108.

Furthermore, as housing 110 has been formed by attaching housing cover 121 to the under side of base plate 115, and by fitting the opening part 123 to the front side, the removal and replacement operation of battery 108 is performed in a forward direction, making it unnecessary to interfere with the wheelchair body members. The housing 110 has been located in a high position as close as possible to seat 106, making it difficult for flicked-up mud, stones or road surface projections, etc., to collide with the housing while operating out of doors.

Furthermore, as the battery 108 is constructed to be slim, housing cover 121 is also thin which enables its fitted position to housing 110 to be further raised. In addition, by forming the housing cover 121 from relatively rigid and hard material, electrical equipment including the battery 108, control unit 107, discharge connector 133 and conductor 132, 136, etc., are further protected from collisions from flying stones, etc. From an outward appearance, the wheelchair resembles that of a common manually operated light wheelchair without an assist drive.

In addition, lid 124 allows opening portion 123 to be closed following the replacement of the battery 108 preventing rainwater from entering the inside part of the housing cover 121 from the opening part 123. Thereby, improved water resistance capacity of the electrical equipment housed inside including battery 108 and control unit 107, etc. is achieved, especially with regard to the area surrounding the discharge connector 133. Consequently, by improving the protection capacity of the electrical equipment including the battery 108 and control unit 107 from dirt and any impact and by improving the water resistance capacity of the discharge connector 133, etc., the wheelchair according to the present invention is sufficiently suited for outdoor use.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrically driven wheelchair comprising:

a wheelchair body frame;

a seat, including a base plate mounted under said seat integrally, said seat being removably mounted relative to said wheelchair body frame;

a battery driven motor operatively mounted on the wheelchair;

drive wheels supported for rotation on the wheelchair body frame, said drive wheels being driven by said battery powered motor;

a control unit for controlling the actuation of said battery powered motor; and a housing for positioning a battery and the control unit, said housing being integrally connected under said seat base plate, said seat and said housing being removably mounted relative to said wheelchair body frame for selectively detaching said seat and said housing together from the wheelchair frame.

2. The electrically driven wheelchair according to claim 1, and further including an actuating lever operatively connected to the battery driven motor for selectively connecting a drive shaft of the motor to the drive wheels of the wheelchair and selectively disengaging the drive shaft of the motor from the drive wheels to enable said housing to be removed from the wheelchair frame.

3. The electrically driven wheelchair according to claim 2, wherein the drive shaft is connected to an axle stay secured to the drive wheels for providing rotation thereto.

4. The electrically driven wheelchair according to claim 2, wherein the drive shaft is connected directly to an axle hub of the drive wheels to provide a direct connection between the drive shaft of the motor and the axle hub of the driven wheels.

5. The electrically driven wheelchair according to claim 1, wherein said seat includes a support shaft projecting therefrom for mating with a stay secured to said wheelchair frame for mounting said seat relative to said wheelchair frame.

6. A wheelchair with an electrical driving apparatus attached for providing assisted driving for wheels operatively mounted for rotation relative to said wheelchair comprising:

a housing for the electrical driving apparatus including a battery and a control unit;

said housing being mounted integrally on an under surface of a seat removably mounted relative to said wheelchair, said housing including an opening portion for inserting and removing the battery being located on a front under portion of the seat.

7. The wheelchair with an electrical driving apparatus according to claim 6, wherein the opening portion is provided with an opening and closing lid.

8. The wheelchair with an electrical driving apparatus according to claim 6, wherein the battery is removable in a forward direction relative to the seat of the wheelchair.

9. The wheelchair with an electrical driving apparatus according to claim 6, further including a motor, wherein a discharge terminal of the battery and a discharge connector of the motor being connected and disconnected at the same time as the battery is attached or removed from the housing.

10. The wheelchair with an electrical driving apparatus according to claim 6, and further including engagement lugs mounted on said seat for engaging openings in said wheelchair for mounting said seat relative thereto.

* * * * *